March 15, 1960 V. L. STREETER 2,928,414
CONSTANT FLOW CONTROL DEVICE
Filed Jan. 17, 1955 2 Sheets-Sheet 1

INVENTOR
VICTOR L. STREETER

ATTORNEYS

March 15, 1960  V. L. STREETER  2,928,414
CONSTANT FLOW CONTROL DEVICE
Filed Jan. 17, 1955  2 Sheets-Sheet 2

INVENTOR
VICTOR L. STREETER

BY  ATTORNEYS

United States Patent Office 2,928,414
Patented Mar. 15, 1960

2,928,414
CONSTANT FLOW CONTROL DEVICE

Victor L. Streeter, Ann Arbor, Mich., assignor to The Dole Valve Company, Chicago, Ill., a corporation of Illinois Application January 17, 1955, Serial No. 482,158

1 Claim. (Cl. 137—517)

The present invention relates to a constant flow control device, and more particularly relates to a flow control device wherein the mechanism is operable to maintain the flow substantially constant substantially independently of pressure variations at the fluid inlet to the device and fluid pressure across the device.

The flow control device of the instant invention has many of the operating characteristics of the devices disclosed in my copending applications for patent, such as my parent application entitled "Adjustable Flow Control," U.S. Serial No. 446,867, filed July 30, 1954, of which this is a continuation-in-part, and my application for patent entitled "Adjustable Flow Control," U.S. Serial No. 482,157, filed on even date herewith.

While the instant invention incorporates many of the principles and laws developed and set forth in those co-pending applications for patent, the present invention further has as one of its objects and principles the provision of a flow control device of the stated character which is preset and may be installed in a permanent installation without need for variation of the flow therethrough even though the device is finely adjustable. Devices embodying the principles of the present invention incorporate therein valve structure of the metering pin and orifice type wherein the orifice plate is fixed in its position while the metering pin is mounted on resilient springs and is contoured with the springs in contour co-operating to maintain flow through the device substantially constant and independent of fluid pressure and fluid pressure drop variations.

It is, therefore, an important object of the present invention to provide a new and improved constant flow control device of the metering pin and orifice type wherein the orifice plate is fixed in its position and the poppet or metering pin is contoured and mounted on non-linear springs which so cooperate with the contour of the poppet that flow through the device is substantially constant and substantially independent of fluid pressure and fluid pressure drop variations across the device.

Still another object of the present invention is to provide a new and improved flow control for constant flow and wherein the orifice plate is fixed while the contoured poppet is resiliently mounted and wherein flow through the device follows the law $$Q = C_D A_{min} \sqrt{2gh_0H} e^{\frac{z \ln H}{2Y}}$$

where $C_D$ is the discharge coefficient.

It is still another object of the present invention to provide a new and improved control device a described wherein the metering pin has a profile which follows the law $$x = \frac{2Y}{\ln H} \left\{ \ln \left[ 2\sqrt{2\pi} \frac{\left(r_0 - \frac{t}{2}\right)}{A_{min}} \frac{Y}{\ln H} \sqrt{1 - \sqrt{1 - \left(\frac{t \ln H}{Y}\right)^2}} \right] - \frac{1}{2} \left[ 1 - \sqrt{1 - \left(\frac{\ln H}{Y}\right)^2} \right] \right\}$$

Still another object of the present invention is to provide a new and improved flow control device as described wherein the profile poppet or metering pin is supported by springs for resilient deflection with backing profile in accordance with the law $$\bar{y} = \frac{l}{\ln H} \left[ \frac{9}{2}(l-\bar{x}) - \frac{1}{2}(l-\bar{x})^3 - 3\ln(l-\bar{x}) - 4 \right] + \frac{G\bar{x}^2}{2}(3-\bar{x})$$

wherein $$G = \frac{F_0 l^3}{3EIY}, \quad \bar{x} = \frac{x_0}{l}, \quad \text{and} \quad \bar{y} = \frac{y_0}{Y}$$

$F_0$ is the spring loading corresponding to head $h_0$. Y is the displacement of the poppet as the fluid head changes from minimum design head to maximum design head.

Still other objects, features and advantages of the present invention will become readily apparent from the following detail description of the principles and an embodiment thereof, from the claims, and from the accompanying drawings, in which each and every detail shown is fully and completely disclosed as a part of this specification, and wherein like reference numerals refer to like parts and:

Figure 4:
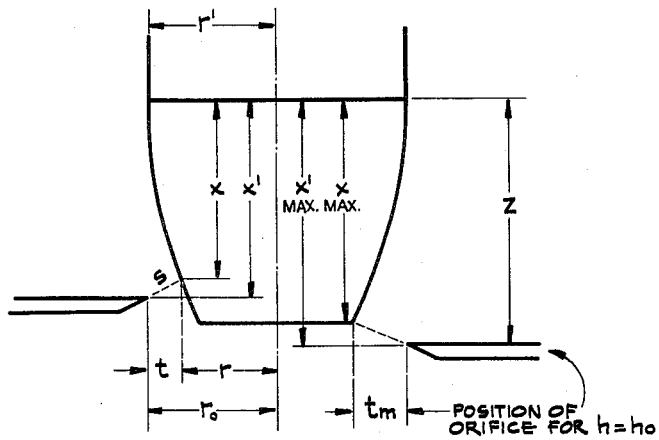
Figure 3:
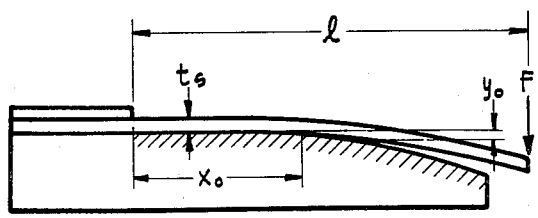

Figure 3 is a more or less schematic and diagrammatic illustration of the backing plate and a single leaf of the spring for supporting the contoured poppet; and Figure 4 is a more or less diagrammatic illustration of the poppet head and orifice plate showing various positions thereof with respect to each other and having indications thereon of the notations utilized in the laws which the poppet and spring must follow which is also true of the notations on Fig. 3.

In many fluid flow installations such as hot water or other liquid flow systems it has been found highly desirable to include within the system a mechanism for maintaining fluid flow rate substantially constant, quantity-wise, and to maintain this flow constant substantially independent of pressure variations in the fluid flow lines. In numerous of these installations it is in no way essential that the flow control device be variable, except possibly for the purposes of slight adjustment of the device to the preselected flow levels.

Figure 2:
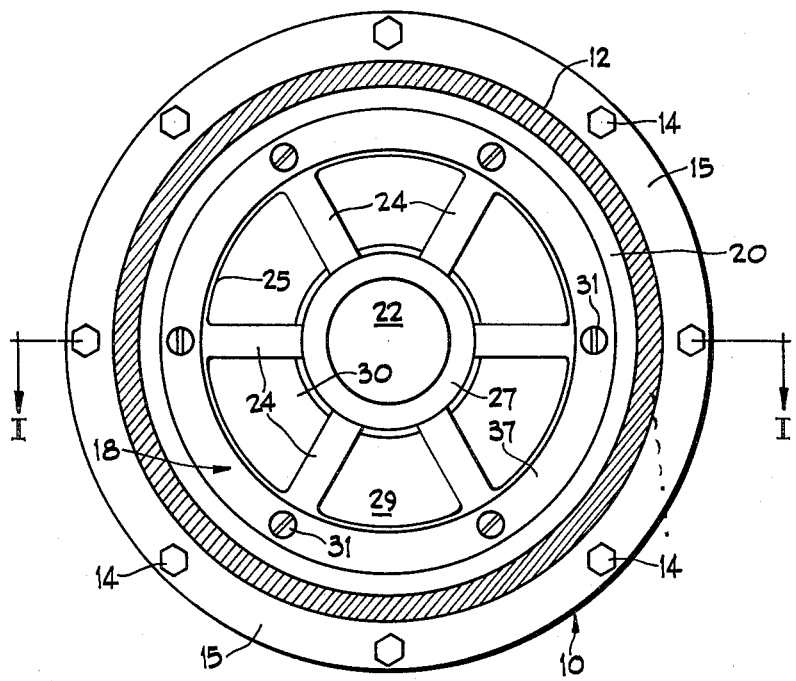
Figure 2 is a horizontal sectional view of the device of Fig. 1 and shown substantially as taken along the line II—II of Fig. 1.
Figure 1:
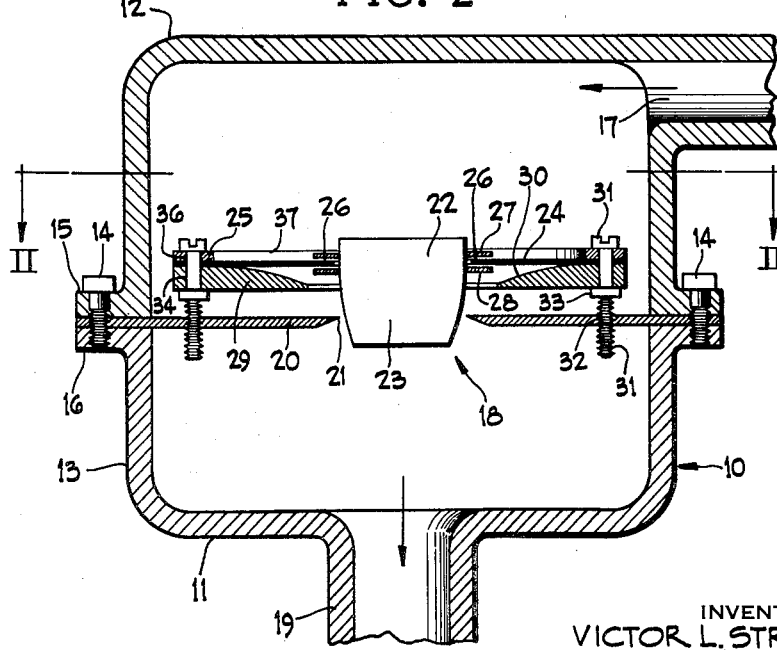
Figure 1 is a vertical sectional view of a constant flow control device embodying the principles of the present invention and shown substantially as taken along the line I—I of Fig. 2.

In accordance with these needs, the present invention is provided to obviate the same and supply such a control device as that illustrated in Figs. 1 and 2.

As illustrated in these two figures a flow control device 10 wherein the housing 11 is formed of an inlet section 12 and an outlet section 13 which are clamped and sealed together by means of bolts or screws 14 or the like which extend through flanges 15 and 16 on the mating faces thereof and radially outwardly thereof. The inlet section 12 also has incorporated therein a boss 17 which forms an inlet to the valve mechanism 18 within the confines of the housing, while the outlet section 13 has a fluid outlet boss 19 thereon.

Fluid flow through the device from the inlet 17 to the outlet 19 is controlled and maintained substantially constant through the operation of the valve device 18 within the housing 11. The details of this flow controller follow the laws established in my aforementioned copending applications including my parent application and the identified application filed on even date herewith. In the device of the instant invention, however, there is provided an orifice plate 20 (Fig. 1) which has a knife edge orifice 21 therein and which is supported by two sections of the housing by being clamped between the flanges 15 and 16 and by the screws or bolts 14. Thus, the orifice plate 20 is positively fixed and secured in place within the housing 11 and provides a partition within the device and between the inlet 17 and the outlet 19 to stop fluid flow therebetween except through the knife edge orifice 21 (Fig. 1).

There is mounted for reciprocation within the orifice 21 and coaxially therewith, a profiled or contoured metering pin or poppet 22 which has a contoured head 23 for cooperation with the orifice 21 to limit fluid flow through the device to flow through the area between the edge of the orifice 21 and the closest adjacent position on the poppet head 23, note in this connection the illustration of Fig. 4 wherein the area here under discussion is defined by revolution of the line S between the edge of the orifice and the closest adjacent position on the poppet head. This area is defined, in accordance with the theory of Pappus, as $$A = 2\pi \left(r_0 - \frac{t}{2}\right)\sqrt{(x'-x)^2 + t^2}$$

wherein the letter designations represent the dimensioned designations on Fig. 4 where $r_0$ is the diameter of the orifice, $t$ is the horizontal projection of the dimension $s$, $x'$ is the distance from the beginning of the contour of the poppet to the plane surface of the orifice, while $x$ is the distance from the beginning of the contour to the control position on the poppet head. In accordance with the principles of the present invention, however, $A$ is equal to $$A_{min} e^{\frac{x' \ln H}{2Y}}$$

wherein H is a fixed ratio of maximum head to minimum head within the design control range of the device and Y is the dimension of maximum movement for the poppet head. $A_{min}$ is the annular area for poppet position $x'=0$.

Equating these expressions and acting upon the same in the manner set out in my copending application filed on even date herewith it will be observed that $$x' - x = \frac{Y}{\ln H}\left(1 - \sqrt{1 - \left(\frac{t \ln H^2}{Y}\right)}\right)$$

and it further develops therefrom that the proper profile of the metering pin head is $$x = \frac{2Y}{\ln H}\left\{\ln\left[2\sqrt{2\pi}\frac{\left(r_0 - \frac{t}{2}\right)}{A_{min}}\frac{Y}{\ln H}\sqrt{1 - \sqrt{1 - \left(\frac{t \ln H}{Y}\right)^2}} - \frac{1}{2}\sqrt{1 - \left(\frac{t \ln H}{Y}\right)^2}\right]\right\}$$

It will be understood, of course, that the expression $$A = A_{min} e^{\frac{x' \ln H}{2Y}}$$

is the basic law for the pin profile when solved for $x'$ and is developed in both of my aforementioned applications.

In order that the poppet head cooperate properly with the fixed orifice, however, it is supported on a plurality of cantilever type leaf springs 24—24 which radiate inwardly from a ring 25 with which they are integral. The tip ends 26—26 of the leaf springs 24 support the poppet or metering pin 22 by extending between a pair of radial annular shoulders 27 and 28 in the upper uncountered region of the metering pin.

While variations may be made it is preferred construction that the tips 26 of the cantilever leaf springs 24 remain unsecured to the flanges or shoulders 27 and 28 so that the springs may operate in a truly cantilever leaf manner for deflection in a manner as shown in Fig. 3.

Deflection of the cantilever leaf springs 24 is in a pre-designed non-linear manner since these leaf springs are supported on a contoured segmented backing ring or plate 29 having a contoured face 30 against which the springs will progressively lay down as described hereinafter and which may be cut away except under the spring leaves. The backing plate 29 is supported on threaded studs 31—31 which are threaded through threaded apertures 32 (Fig. 1) in the orifice plate 20 and which are provided with nuts 33 on which the plate 29 rests. The studs 31 extend through the appropriate apertures 34, 35 and 36, respectively, in the backing plate 29, the spring ring 25 and a clamping ring 37 so that the assembly is clamped between the head 38 of the studs 31 and the nut 33 on each stud.

The manner in which the spring will deflect due to pressure variation across the poppet head is indicated in Fig. 3 wherein it is shown that the springs 24 lay down progressively for continuous shortening thereof as the force or pressure increases, against the contoured face 30 of the backing plate 29. As developed in my aforementioned copending applications, the relation between the backing and the spring with a poppet head as described above should be $$\frac{1}{3}(l-\bar{x})^2\frac{d^2\bar{y}}{d\bar{x}^2} + (l-\bar{x})\frac{d\bar{y}}{d\bar{x}} + \bar{y} = -\frac{3}{\ln H}\ln(l-\bar{x}) + \frac{F_0 l^3}{3EIY}$$

Development of this law for the spring and the backing profile with respect to the metering pin or poppet profile breaks down to $$\bar{y} = \frac{l}{\ln H}\left[\frac{9}{2}(l-\bar{x}) - \frac{1}{2}(l-\bar{x})^3 - 3\ln(l-\bar{x}) - 4\right] + \frac{G\bar{x}^2}{2}(3-\bar{x})$$

With the spring, spring backing and poppet profile obeying the laws set forth hereinabove, it will be seen that the flow through the controller will be maintained substantially constant and substantially independent of pressure. The device of the instant invention, however, may be finely adjusted for presetting at any desired flow control level within the design range of the device by adjustment of the screws or studs 31 which will vary the position of the poppet head within the orifice and thereby reset or adjust the flow level of the device. It will be understood, of course, that this is primarily a fine adjustment for setting at a preselected level of operation for the device, which level is a designed level. It will also be understood that numerous variations and modifications may be made without departing from the true spirit and scope of the novel concepts and principles of my invention and I, therefore, intend to cover those modifications and variations.

I claim as my invention:

In a flow control device to maintain the flow rate of fluid in a fluid system substantially constant, a housing for fluid flow therethrough, an orifice plate mounted in said housing in the path of flow therethrough and secured thereto, said plate having a substantially knife edge annular orifice therein, a contoured poppet having a profile law $$x = \frac{2Y}{\ln H}\left\{\ln\left[2\sqrt{2\pi}\frac{\left(r_0 - \frac{t}{2}\right)}{A_{min}}\frac{Y}{\ln H}\sqrt{1 - \sqrt{1 - \left(\frac{t \ln H}{Y}\right)^2}} - \frac{1}{2}\left[1 - \sqrt{1 - \left(\frac{t \ln H}{Y}\right)^2}\right]\right]\right\}$$

wherein $x$ is the distance from the beginning of the contour to the control position of the poppet head $Y$ is the dimension of maximum movement for the poppet head ln is the natural logarithm $H$ is the fixed ratio of maximum head to minimum head within the design control range $r_0$ is the diameter of the orifice $t$ is the horizontal projection of a line from the edge of the orifice to the closed adjacent position on the poppet head $A_{min}$ is the flow area for a poppet position when the plane surface of the orifice coincides with the beginning of the curvature of the poppet and said poppet being mounted for resilient axial movement in said orifice, a plurality of leaf springs resiliently supporting said poppet, a backing plate underlying said springs, and means fixing said springs and backing plate to said housing, said spring backing plate having a profile in accordance with the law $$\bar{y}=\frac{l}{\ln H}\left[\frac{9}{2}(l-\bar{x})-\frac{1}{2}(l-\bar{x})^3-3\ln(l-\bar{x})-4\right]+\frac{G\bar{x}^2}{2}(3-\bar{x})$$

wherein $\bar{y}$ is dimensionless axial coordinate of backing plate $\bar{x}$ is dimensionless radial coordinate of backing plate ln is the natural logarithm $H$ is ratio of maximum fluid head to minimum fluid head $l$ is spring length $G$ is the spring characteristic $=\dfrac{F_0 l^3}{3EIY}$ References Cited in the file of this patent

UNITED STATES PATENTS

| | | |
|---|---|---|
| 1,154,962 | Bayles | Sept. 28, 1915 |
| 1,658,547 | Aseltine | Feb. 7, 1928 |
| 1,944,088 | Linderoth | Jan. 16, 1934 |
| 2,179,144 | Buttner | Nov. 7, 1939 |
| 2,295,044 | McCarty | Sept. 8, 1942 |
| 2,684,081 | Chace | July 20, 1954 |
| 2,827,076 | Obermaier | Mar. 18, 1958 |

FOREIGN PATENTS

| | | |
|---|---|---|
| 595,243 | Germany | Apr. 5, 1934 |

OTHER REFERENCES

A.S.M.E. Transactions (Clurman), vol. 73, published by A.S.M.E., 1951, pp. 155–161 (copy in Scientific Library).